United States Patent
Lee et al.

(10) Patent No.: US 9,041,515 B2
(45) Date of Patent: May 26, 2015

(54) APPARATUS COMPRISING DISPLAY DRIVING INTEGRATED CIRCUIT AND RADIO-FREQUENCY IDENTIFICATION READER

(75) Inventors: Seung-gun Lee, Hwaseong-si (KR); Young-min Song, Seoul (KR); Yong-jae Kim, Yongin-si (KR); Im-soo Kang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 961 days.

(21) Appl. No.: 13/155,457

(22) Filed: Jun. 8, 2011

(65) Prior Publication Data

US 2011/0298590 A1 Dec. 8, 2011

(30) Foreign Application Priority Data

Jun. 8, 2010 (KR) ........................ 10-2010-0054053

(51) Int. Cl.
| | | |
|---|---|---|
| *H04Q 5/22* | (2006.01) | |
| *G06K 7/00* | (2006.01) | |
| *G06F 1/26* | (2006.01) | |
| *G06F 3/147* | (2006.01) | |

(52) U.S. Cl.
CPC .............. *G06K 7/0008* (2013.01); *G06F 1/26* (2013.01); *G06F 3/147* (2013.01); *G09G 2330/021* (2013.01); *H04Q 2213/095* (2013.01)

(58) Field of Classification Search
CPC ... G06K 7/0081; G06K 19/0723; H04B 1/202
USPC ................. 340/10.3, 10.4, 10.5, 12.51, 5.61, 340/13.31, 505
See application file for complete search history.

(56) References Cited

U.S. PATENT DOCUMENTS

| | | | | |
|---|---|---|---|---|
| 6,424,263 | B1 * | 7/2002 | Lee et al. .................... | 340/572.7 |
| 7,398,932 | B2 * | 7/2008 | Ashili et al. .................. | 235/492 |
| 7,450,010 | B1 * | 11/2008 | Gravelle et al. ............ | 340/572.1 |
| 8,258,953 | B2 * | 9/2012 | Stern et al. ................. | 340/572.1 |
| 2007/0069864 | A1 * | 3/2007 | Bae et al. .................... | 340/10.2 |
| 2008/0116278 | A1 * | 5/2008 | Epshteyn ................. | 235/462.25 |

FOREIGN PATENT DOCUMENTS

| | | |
|---|---|---|
| JP | 2008096464 | 4/2008 |
| JP | 2008181110 | 8/2008 |
| KR | 1020070114172 A | 11/2007 |

* cited by examiner

*Primary Examiner* — Vernal Brown
(74) *Attorney, Agent, or Firm* — Voentine & Whitt, PLLC

(57) ABSTRACT

A display driving integrated circuit operates as both a radio-frequency identification (RFID) reader and a display driver. The display driving integrated circuit operates as the RFID reader by supplying power to an RFID tag, verifying the RFID tag according to communication between the RFID tag and the processor to produce verification data, transferring the verification data from the processor to the RFID tag, and transmitting some of the verification data to the display unit. It operates as a display driver by processing data received from the processor and transferring the processed data to the display unit. The display driving integrated circuit implements functions for the RFID reader and the display unit driver using one or more shared elements selected from a timer, a clock signal generator, a cyclic redundancy check calculator, and a data interface.

20 Claims, 6 Drawing Sheets

US 9,041,515 B2

APPARATUS COMPRISING DISPLAY DRIVING INTEGRATED CIRCUIT AND RADIO-FREQUENCY IDENTIFICATION READER

CROSS-REFERENCE TO RELATED APPLICATIONS

This application claims priority under 35 U.S.C. §119 to Korean Patent Application No. 10-2010-0054053 filed on Jun. 8, 2010, the disclosure of which is hereby incorporated by reference in its entirety.

BACKGROUND OF THE INVENTION

Embodiments of the inventive concept relate generally to electronic display technologies and radio frequency identification technologies. More particularly, embodiments of the inventive concept relate to display driving integrated circuits that perform display driving functions and also act as radio-frequency identification (RFID) readers.

A display driving integrated circuit is often included in electronic display technologies such as liquid crystal display (LCD) monitors, digital televisions, mobile devices, and others. The display driving integrated circuit transfers driving signals and data to a flat panel display unit so that characters and images can be displayed on the flat panel display unit.

RFID technology is commonly used to wirelessly track and identify various objects such as humans, animals, packages, devices, and others. RFID technology overcomes certain disadvantages of barcodes and magnetic cards. An RFID system typically comprises a RFID tag, a RFID reader, and a host. The RFID tag transmits data wirelessly, and the RFID reader receives the data via an antenna, decodes the data, and transmits the decoded data to the host. The RFID system can be used to automate various processes, such as access control or security, animal quarantine, transport monitoring, baggage management, toll collection, and container management, to name but a few.

SUMMARY OF THE INVENTION

According to one embodiment of the inventive concept, an apparatus comprises a processor, a display unit that reproduces image data, and a display driving integrated circuit that operates as an RFID reader by supplying power to an RFID tag, verifying the RFID tag according to communication between the RFID tag and the processor to produce verification data, transferring the verification data from the processor to the RFID tag, and transmitting some of the verification data to the display unit, and also operates as a display driver by processing data received from the processor and transferring the processed data to the display unit. The display driving integrated circuit implements functions for both the RFID reader and the display unit driver using one or more shared elements selected from a timer, a clock signal generator, a cyclic redundancy check (CRC) calculator, and a data interface.

According to another embodiment of the inventive concept, an apparatus comprises a processor, a display unit that reproduces image data, a display driving integrated circuit that processes data received from the processor and transfers the processed data to the display unit, and an RFID reader that supplies power to an RFID tag, and verifies the RFID tag by performing communication between the RFID tag and the processor, transfers verification data applied from the processor to the RFID tag, and transmits some of the verification data to the display unit. The display driving integrated circuit and the RFID reader share at least one of a power voltage generating circuit, a timer, a CRC calculator, a clock signal generator, a data interface, and a power regulator.

According to another embodiment of the inventive concept, a display driving integrated circuit comprises a clock signal generator that generates a clock signal in response to an instruction signal, a timer that generates a timing signal and a first control signal in response to the instruction signal and the clock signal, a data interface that transmits data to and receives data from a processor, and a communication information interface that transmits information to and receives information from an RFID tag using an antenna. The display driving integrated circuit further comprises a logic circuit that processes information transmitted by the communication information interface according to the timing signal and the clock signal, a first storage device that stores RFID data or image data input through the data interface, and a CRC calculator that calculates a CRC value of data transmitted from the logic circuit and the data interface, and determines whether an error is introduced in the transmitted data during transmission to generate an error detection result. The display driving integrated circuit still further comprises a command controller that generates the instruction signal according to the data transmitted received from the logic circuit and the data interface, and controls the data interface according to the error detection result such that the data applied from the data interface is transferred to the first storage device, and a second storage device that stores data output from the logic circuit, generates a second control signal under the control of the command controller, and transfers the stored data input from the logic circuit to the first storage device.

These and other embodiments of the inventive concept can

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

Figure 1:
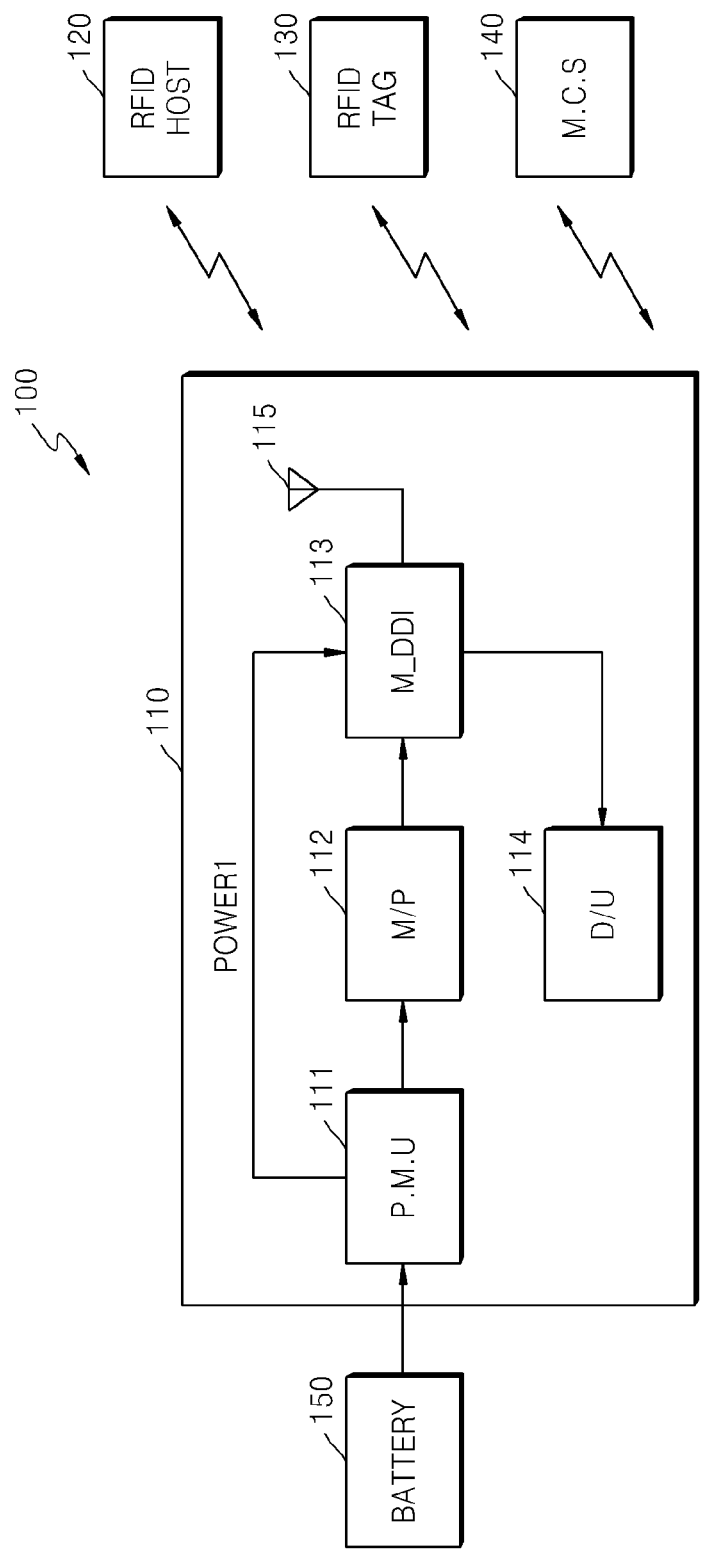
FIG. 1 is a block diagram of a system comprising a multi-functional display driving integrated (DDI) circuit.

FIG. 1 is a block diagram of a system 100 comprising a multi-functional DDI circuit according to an embodiment of the inventive concept.

Referring to FIG. 1, system 100 comprises a module 110, an RFID host 120, an RFID tag 130, a wireless communication base station 140, and a battery 150. Module 110 can be driven independent of other features to function as a display driving system, or it can be driven together with RFID host 120 and RFID tag 130 as part of system 100. Module 110 can also be driven together with wireless communication base station 140 to operate as part of a wireless communication system.

Module 110 comprises a power management unit 111, a main processor 112, a multi-functional DDI circuit 113, and a display unit 114. To support wireless operation, module 110 is connected to an antenna 115 and a battery 150.

Power management unit 111 receives power from battery 150 and supplies the power to main processor 112 and multi-functional DDI circuit 113. The power is provided to multi-functional DDI circuit 113 through a line POWER1. In some embodiments, the same line is used to supply power to multi-functional DDI circuit 113 and main processor 112. However, different lines can be used. Multi-functional DDI circuit 113 is connected to antenna 115, and it wirelessly exchanges signals with external devices, such as RFID host 120, RFID tag 130, and wireless communication base station 140. Although module 110 is used for wireless communication in the embodiment of FIG. 1, module 110 can also be used in a wired system.

Multi-functional DDI circuit 113 comprises a single integrated circuit that implements functions for both a DDI circuit and an RFID reader. In other embodiments, the DDI circuit and the RFID reader can be formed as two integrated circuits.

Figure 2:
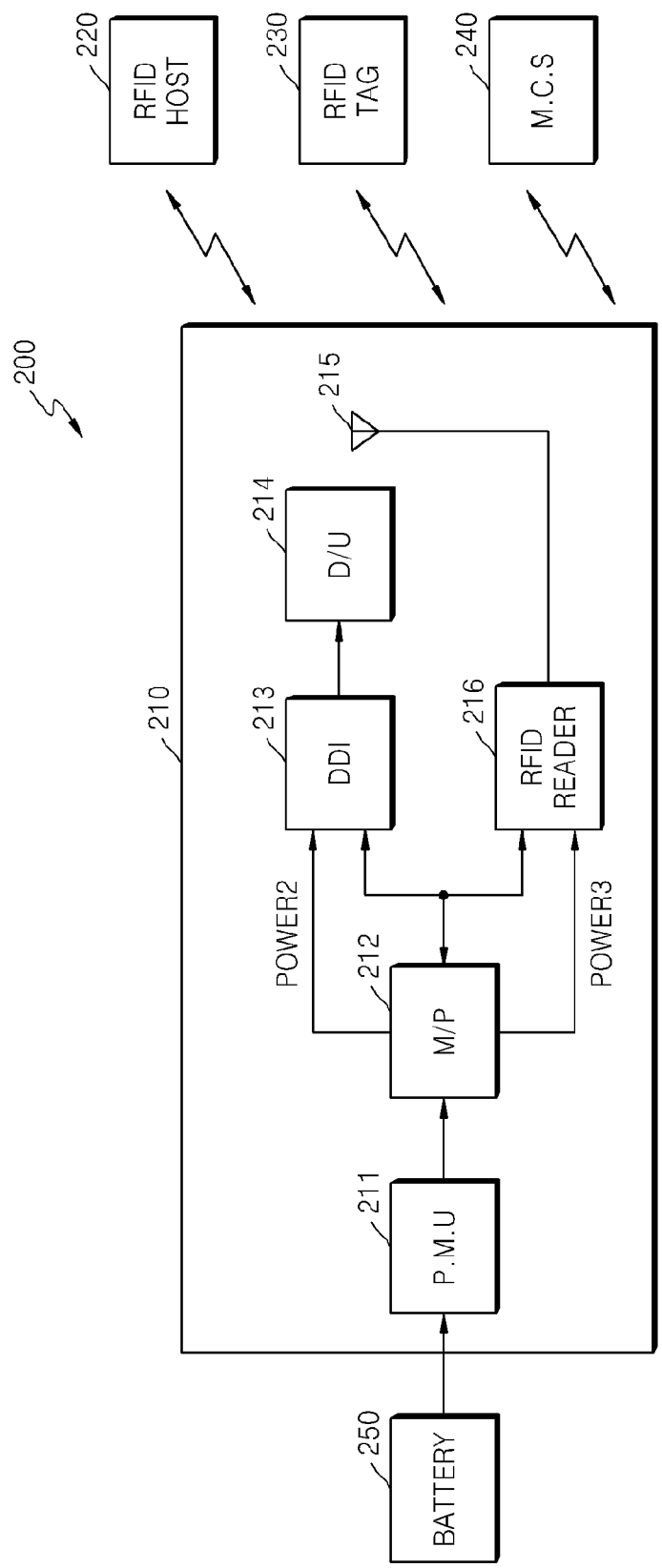
FIG. 2 is a block diagram of a system comprising a DDI circuit and an RFID reader integrated circuit that share functional blocks.

FIG. 2 is a block diagram of a system 200 comprising a DDI circuit and a RFID reader integrated circuit sharing functional blocks with each other.

Referring to FIG. 2, system 200 comprises a module 210, an RFID host 220, an RFID tag 230, a wireless communication base station 240, and a battery 250.

Module 210 comprises a power management unit 111, a main processor 212, a DDI circuit 213, a display unit 214, an antenna 215, and an RFID reader 216. DDI circuit 213 performs a display driving function by processing data received from main processor 212 and transferring the processed data to display unit 214. RFID reader 216 supplies power to RFID tag 230 and communicates between RFID tag 230 and main processor 212 to verify RFID tag 230. RFID reader 216 also transfers verification data applied from main processor 212 to RFID tag 230 and transfers some of the verification data to display unit 214. In contrast to module 110 of FIG. 1, module 210 comprises two separate integrated circuits that perform functions of a DDI circuit and functions of a RFID reader. Common functional blocks can be implemented in one integrated circuit and shared.

Power management unit 211 supplies power to the two functional blocks, DDI circuit 213 and RFID reader 216, using two separate power lines POWER2 and POWER3. In some embodiments, power management unit 211 supplies power to one functional block and other functional block shares parts of the functional block that receives the power, as will be described later.

Comparing FIGS. 1 and 2, FIG. 1 illustrates an example where functions of the DDI circuit and the RFID reader are provided by one integrated circuit 113, and FIG. 2 illustrates an example where functions of the DDI circuit and the RFID reader are provided by two functional blocks 213 and 216. Because functional blocks 213 and 216 comprise circuits performing common functions, the common circuits can be formed in one integrated circuit as in the example of FIG. 1, or some of the common circuits can be used in common while others are used separately.

Where RFID technology is used in applications requiring transmission at a short distance, such as access control or transport cards, the RFID reader and the RFID tag generally communicate with each other at a frequency range between 125 KHz and 13.56 MHz. On the other hand, where RFID technology is used in applications requiring transmission from a longer distance, such as circulation, physical distribution, or environmental monitoring, the RFID reader and the RFID tag can communicate with each other at a frequency range between 900 MHz and 2.4 GHz.

The range of an RFID reader can be determined by a variety of factors, such as an antenna in the RFID reader, an environment of the RFID reader, and accuracy of detection. The antenna is generally designed to transmit and receive signals of various frequencies as described above. In some embodiments, two to four antennas are used to improve the identification characteristics. However, for explanation purposes, it will be assumed that certain embodiments use a beam-forming antenna technology that controls a beam according to the peripheral environment. A mobile RFID using the beam-forming antenna technology can have improved functions compared to a conventional RFID reader.

Antenna 115 of FIG. 1 and antenna 215 of FIG. 2 are used primarily to transmit and receive information to and from RFID tag 130 and 230. Where a high-functional antenna is already installed in a wireless communication device incorporating module 110 or 210, an additional antenna may not be necessary. However, where the high-functional antenna transmits data in a different frequency range from module 110 or 210, an additional antenna may be installed. In some embodiments, an RFID antenna is formed in a liquid crystal display panel, and an additional antenna is omitted from module 110 or 210.

The operation of systems 100 and 200 will be described in the context of an example involving transport cards. In this example, the RFID tag corresponds to a transport card carried by a passenger, and the RFID reader corresponds to a transport card reader installed in a vehicle. Where the passenger makes contact between the transport card and the transport card reader, or approaches the transport card reader within a predetermined distance, the transport reader performs a verification process of the transport card. Where the transport card is verified, a fare is subtracted from a remaining credit in the transport card, and information about the remaining credit is transmitted to the RFID tag and displayed on a display unit of the transport card reader. The remaining credit is stored in a storage unit in the RFID tag, and is loaded in a next use of the transport card.

In addition having overlapping functional blocks, system 200 can also have overlapping input/output terminals. For instance, where system 200 performs both RFID reader and display driving functions, overlapping functional blocks and an input/output interface may be configured to be used commonly. Then, the number of blocks forming the system may be reduced and the number of transmitting/receiving interfaces of the signals and information can be reduced as well. As a result, the complexity of system 200 can be reduced.

Hereinafter, an example where the DDI circuit and the RFID reader functions are performed in one integrated circuit and an example where the DDI circuit and the RFID reader functions are performed in two separate integrated circuits will be described.

Figure 3:
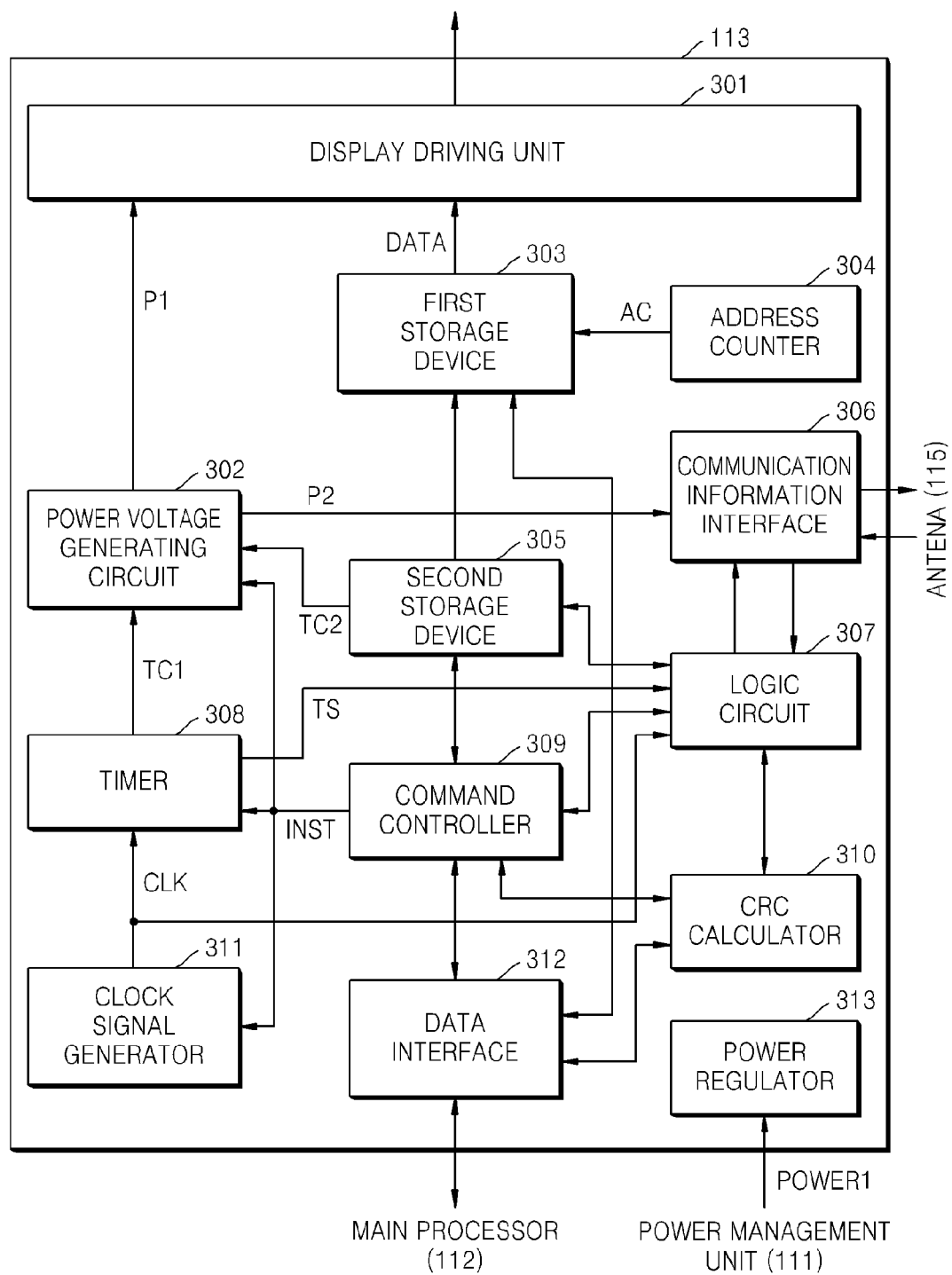
FIG. 3 is a block diagram of an inner structure of the multi-functional DDI circuit of FIG. 1.

FIG. 3 is a block diagram of an inner structure of multi-functional DDI circuit 113 shown in FIG. 1.

Referring to FIG. 3, multi-functional DDI circuit 113 comprises a display driving unit 301, a power voltage generating circuit 302, a first storage device 303, an address counter 304, a second storage device 305, a communication information interface 306, a logic circuit 307, a timer 308, a command controller 309, a cyclic redundancy code (CRC) calculator 310, a clock signal generator 311, a data interface 312, and a power regulator 313.

Display driving unit 301 converts digital data DATA stored in first storage device 303 into an analog signal and transmits the analog signal to display unit 114. Power regulator 313 generates at least a base voltage having a constant voltage level by using a voltage applied from power management unit 111. Power voltage generating circuit 302 supplies power voltages P1 and P2 to a plurality of functional blocks in multi-functional DDI circuit 113 using at least one base voltage generated by power regulator 313.

In the example of FIG. 3, power voltage generating circuit 302 generates two power voltages P1 and P2. Power voltage P1 drives display driving unit 301, and power voltage P2 drives communication information interface 306. In other embodiments, power voltage generating circuit 302 can generate additional power voltages. In addition, the system may be redesigned so that the generated power voltages drive other functional blocks in addition to display driving unit 301 and communication information interface 306.

First storage device 303 stores RFID data or image data DATA input through data interface 312. First storage device 303 comprises a graphic random access memory (RAM) for image data. Address counter 304 generates an address count signal AC to control the storage of external data in a certain storage region of first storage device 303 or to control the output of data stored in a certain region of first storage device 303 to display driving unit 301.

Second storage device 305 receives and stores data output from logic circuit 307, generates a second control signal TC2 under the control of command controller 309, and transfers the data received from logic circuit 307 to first storage device 303. First storage device 303 typically comprises a volatile memory, and second storage device 305 typically comprises a non-volatile memory. Second storage device 305 stores information for verifying RFID tag 130, so the stored information should not be erased even where power is disconnected from second storage device 305.

Communication information interface 306 transmits and receives information to and from RFID tag 130 using antenna 115. Logic circuit 307 processes data transmitted from communication information interface 306 according to a timing signal TS and a clock signal CLK. Where logic circuit 307 verifies RFID tag 130 as the RFID reader, logic circuit 307 compares the verification information stored in second storage device 305 and the information output from RFID tag 130 and input into logic circuit 307 via antenna 115, and then determines whether or not RFID tag 130 is verified.

Timer 308 generates timing signal TS and first control signal TC1 in response to an instruction signal INST and clock signal CLK. As an alternative, some embodiments use clock signals CLK with different periods to control display driving functions and RFID reader functions. In addition, in an idle state where neither the display driving functions nor the RFID reader functions are performed, timing signal TS can be determined by first control signal TC1.

Command controller 309 generates an instruction signal INST according to data received from logic circuit 307 and data interface 312 and controls data interface 312 to output data according to an error detection result output by CRC calculator 310. Data output from data interface 312 is transferred to first storage device 303.

CRC calculator 310 calculates a CRC value of the data transmitted from logic circuit 307 and data interface 312 and determines whether an error has occurred during transmission of the data. The CRC value is calculated from the data prior to its transmission across the network. The calculated CRC value is then attached to the data and transmitted with the data. Following transmission of the data, the CRC value is calculated again using the received data. The CRC value attached to the transmitted data is compared with the CRC value calculated from the received data. Where the two CRC values are different from each other, it is determined that noise was introduced into the data during transmission of the data. The CRC value can be computed in hardware based on a binary scale, and may detect errors that occur during data transmission.

Clock signal generator 311 generates clock signal CLK in response to instruction signal INST. Data interface 312 transmits and receives data to and from main processor 112. Data interface 312 inputs and outputs the data in a parallel interface, a serial peripheral interface (SPI), or a high-speed serial interface (HSSI). The SPI is a communication method using three electric lines. The SPI is suitable in contexts where general purpose interface bus (GPIB) ports of a micro controller unit (MCU) are insufficient. The SPI can be used in conjunction with various data transmission protocols.

The HSSI is a short-distance communication interface that is used to connect routing and switching equipment of a short-distance communication network to high-speed lines in a wide-area network. The HSSI is used between devices located within a range of 50 feet, and the data transmission speed ranges from 2 Mbps to 52 Mbps. The data transmission technology of the HSSI can be implemented using differential emitter coupled logic (ECL).

Hereinafter, an example where DDI circuit functions and RFID reader functions are implemented in two separate integrated circuits will be described. Functional blocks performing the same functions are installed in one of the separate integrated circuits, and these functional blocks are shared. Examples of functional blocks that can be shared include a power voltage generating circuit, a timer, a CRC calculator, a clock signal generator, a data interface, and a power regulator.

Figure 4:
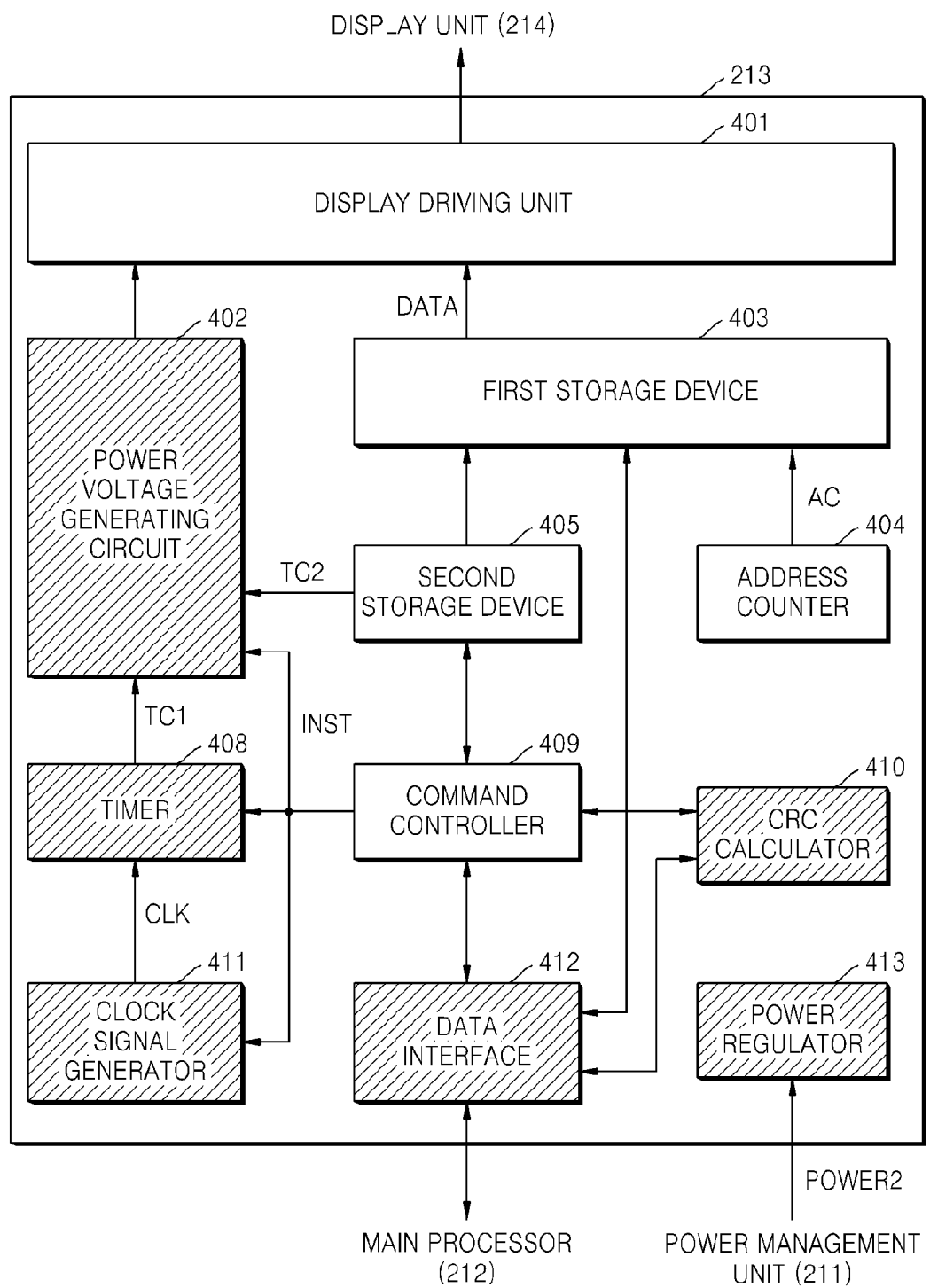
FIG. 4 is a block diagram of an inner structure of the DDI circuit of FIG. 2.

FIG. 4 is a block diagram of an inner structure of DDI circuit 213 of FIG. 2.

Referring to FIG. 4, DDI circuit 213 comprises a display driving unit 401, a power voltage generating circuit 402, a first storage device 403, an address counter 404, a second storage device 405, a timer 408, a command controller 409, a CRC calculator 410, a clock signal generator 411, a data interface 412, and a power regulator 413.

Display driving unit 401 converts digital data DATA stored in first storage device 403 into an analog signal, and transmits the analog signal to display unit 214. Power regulator 413 generates at least one base voltage having a constant voltage level using the voltage applied from power management unit 211 via power line POWER2. Power voltage generating circuit 402 supplies the power voltage to display driving unit 401 using the at least one base voltage generated by power regulator 413.

First storage device 403 stores RFID data or image data DATA input through data interface 412. In some embodiments, first storage device 403 comprises a graphic RAM for image data. Address counter 404 generates an address count signal AC that is used to control the storage of external data in a certain storage region in first storage device 403 and the outputting of data stored in the certain region of first storage device 403 to display driving unit 401.

Second storage device 405 generates a second control signal TC2 under the control of command controller 409. First storage device 403 typically comprises a volatile memory and second storage device 405 comprises a non-volatile memory. Second storage device 405 stores information for verifying RFID tag 230, so the stored information should be retained even where second storage device 405 is disconnected from power.

Timer 408 generates a first control signal TC1 in response to an instruction signal INST and a clock signal CLK.

Command controller 409 generates instruction signal INST according to data received from data interface 412 and controls data interface 412 according to an error detection result output by CRC calculator 410 so that the data output by data interface 412 is transferred to first storage device 403.

CRC calculator 410 calculates a CRC value of the data transmitted from data interface 412 and determines whether an error has occurred during transmission of the data. CRC calculator 410 operates similar to CRC calculator 310 of FIG. 3.

Clock signal generator 411 generates clock signal CLK in response to instruction signal INST. Data interface 412 transmits and receives data to and from main processor 212.

Figure 5:
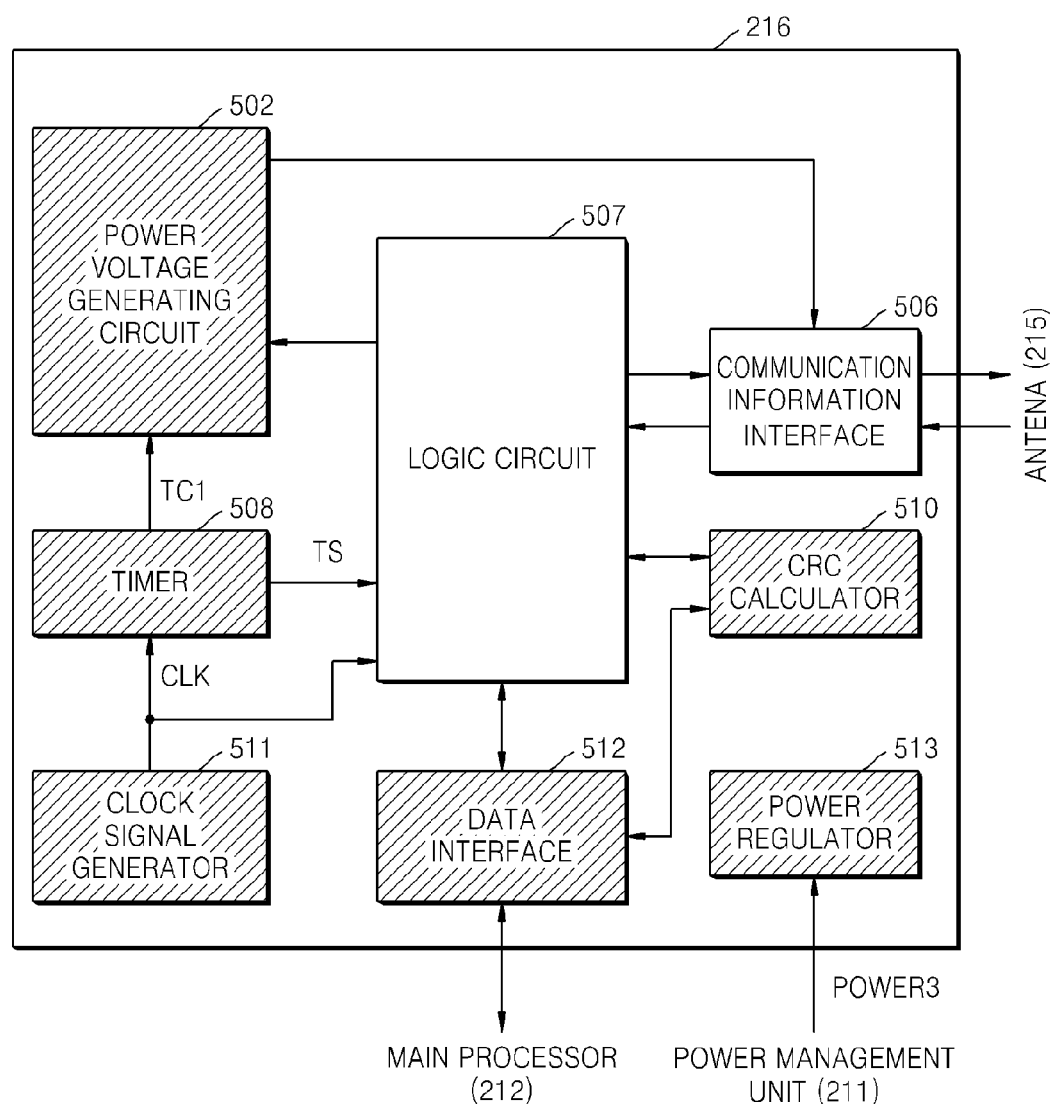
FIG. 5 is a block diagram of an inner structure of the RFID reader of FIG. 2.

FIG. 5 is a block diagram of an inner structure of RFID reader 216 of FIG. 2.

Referring to FIG. 5, RFID reader 216 comprises a power voltage generating circuit 502, a communication information interface 506, a logic circuit 507, a timer 508, a CRC calculator 510, a clock signal generator 511, a data interface 512, and a power regulator 513.

Power regulator 513 generates at least one base voltage having a constant voltage level by using the voltage applied from power management unit 211 via power line POWER3. Power voltage generating circuit 502 supplies the power voltage to communication information interface 506 by using the at least one base voltage generated by power regulator 513.

Communication information interface 506 transmits and receives information to and from RFID tag 230 via antenna 215. Logic circuit 507 processes data transmitted from communication information interface 506 according to a timing signal TS and a clock signal CLK.

Timer 508 generates timing signal TS and first control signal TC in response to clock signal CLK.

CRC calculator 510 calculates a CRC value of the data transmitted from logic circuit 507 and data interface 512, and determines whether an error has occurred during transmission of the data. CRC calculator 510 functions similar to CRC calculator 310 and CRC calculator 410.

Clock signal generator 511 generates clock signal CLK. Data interface 512 transmits and receives data to and from main processor 212.

DDI 213 and RFID reader 216 shown in FIGS. 4 and 5 have several functional blocks that perform similar functions. These functional blocks are indicated by shading. In particular, similar functions are performed by power voltage generating circuits 402 and 502, timers 408 and 508, CRC calculators 410 and 510, clock signal generators 411 and 511, data interfaces 412 and 512, and power regulators 513 and 513. These functional blocks having similar functions can be combined to form multi-functional DDI 113 shown in FIG. 3. However, where two integrated circuits are both used, at least one of the functional blocks can be used.

In various alternative embodiments, one or more of the functional blocks having similar functions can be implemented in separate integrated circuits.

Figure 6:
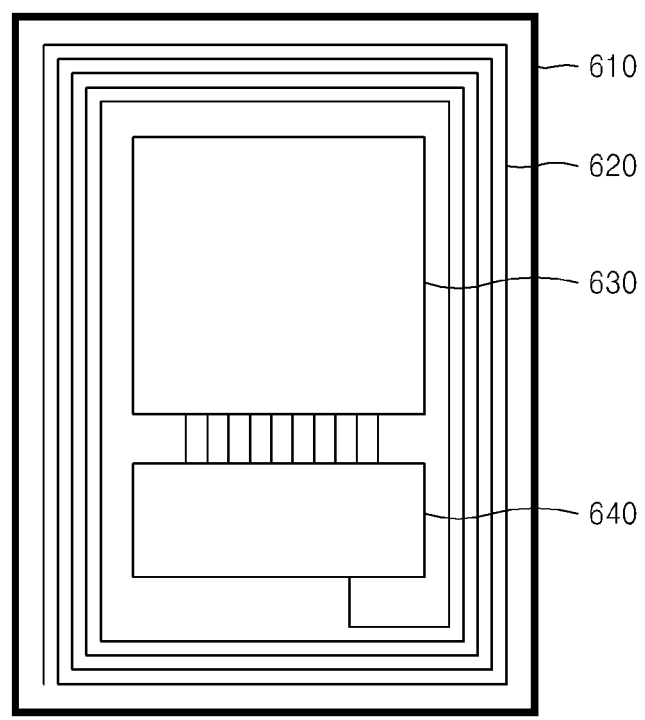
FIG. 6 is a diagram of an integrated circuit installed on a substrate on which an antenna is formed.

FIG. 6 shows an integrated circuit installed on a glass substrate 610 in which an antenna is installed.

Referring to FIG. 6, an antenna 620 formed as a coil on glass substrate 610 is electrically connected to a multi-functional DDI 640 that drives a display panel 630. FIG. 6 shows an example where multi-functional DDI 640 is installed. However, two separate integrated circuits including the DDI and the RFID reader can be installed.

Where an RFID tag chip is formed of an organic transistor, and a target object to which the RFID tag is attached has a surface formed of plastic, the RFID tag can be formed by directly printing the RFID tag onto the surface of the target object. In this case, costs for manufacturing and attaching the RFID tag may be reduced.

Certain embodiments of the inventive concept can be applied in the context of portable electronics. For example, mobile RFID technology can provide a user with mobile network communication by reading an RFID tag using a mobile communication terminal having a built-in RFID reader. The RFID reader can communicate in a frequency band such as 125 KHz, 13.56 MHz, 433 MHz, 860-960 MHz, or 2.45 GHz. Some forms of mobile RFID technology can be classified as near field communication using a radio frequency band of 13.56 MHz and ultra high frequency RFID using a frequency band of 900 MHz.

Certain embodiments of the inventive concept can be applied in contexts such as infectious waste management, harbor physical distribution management, imported beef tracking and management, water-purity monitoring for managing potable water source, monitoring of bridges, management of cultural properties, and weather/marine observation. Moreover, certain embodiments can be used to provide users with mobile services at a frequency band of 13.56 MHz so that payment for goods may be performed by using the mobile phones worldwide. Where a system is installed in a mobile terminal, the size and power consumption of a mobile terminal can be reduced.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. An apparatus, comprising:
    a processor;
    a display unit that reproduces image data; and
    a display driving integrated circuit that operates as a radio-frequency identification (RFID) reader by supplying power to an RFID tag, verifying the RFID tag according to communication between the RFID tag and the processor to produce verification data, transferring the verification data from the processor to the RFID tag, and transmitting some of the verification data to the display unit, and also operates as a display driver by processing data received from the processor and transferring the processed data to the display unit,
    wherein the display driving integrated circuit implements functions for both the RFID reader and the display unit driver using one or more shared elements selected from a timer, a clock signal generator, and a cyclic redundancy check (CRC) calculator.

2. The apparatus of claim 1, further comprising a power management unit that drives the processor and the display driving integrated circuit using power supplied from a battery.

3. The apparatus of claim 2, further comprising an antenna that receives information transferred from the RFID tag, transfers the information to the display driving integrated circuit, and transfers information output from the display driving integrated circuit to the RFID tag.

4. The apparatus of claim 3, wherein the display driving integrated circuit comprises:
   a power regulator that generates at least one regulating voltage using a power voltage received from the power management unit;
   a power voltage generating circuit that generates a plurality of base power voltages having different voltage levels from the regulating voltage in response to a first control signal and an instruction signal;
   the clock signal generator that generates a clock signal in response to the instruction signal;
   the timer that generates a timing signal and the first control signal in response to the instruction signal and the clock signal;
   a data interface that transmits data to and receives data from the processor;
   a communication information interface that transmits information to and receives information from the antenna;
   a logic circuit that processes the data transmitted from the communication information interface according to the timing signal and the clock signal;
   a first storage device that stores RFID data or image data input through the data interface;
   a display driving unit that transfers the data stored in the first storage device to the display unit;
   the CRC calculator that calculates a CRC value of the data transmitted from the logic circuit and the data interface, and determines whether an error is introduced in the transmitted data during transmission to generate an error detection result; and
   a command controller that generates the instruction signal according to the data from the logic circuit and the data interface, and controls the data interface according to the error detection result such that the data applied from the data interface is transferred to the first storage device.

5. The apparatus of claim 4, wherein the display driving integrated circuit further comprises an address counter that generates an address counting signal to control operations of the first storage device.

6. The apparatus of claim 5, wherein the display driving integrated circuit further comprises a second storage device that stores data output from the logic circuit, generates a second control signal under the control of the command controller, and transfers the stored data to the first storage device, and wherein the second control signal is used to control operations of the power voltage generating circuit.

7. The apparatus of claim 1, wherein the clock signal generator further performs a clock signal division operation.

8. The apparatus of claim 1, wherein the one or more shared elements further include a data interface that transmits data to and receives data from the processor in one of a parallel interface type, a serial peripheral interface (SPI) type, and high-speed serial interface (HSSI) type.

9. The apparatus of claim 1, wherein the display driving integrated circuit is formed on a substrate and an antenna is formed on the substrate in the form of a coil.

10. An apparatus, comprising:
    a processor;
    a display unit that reproduces image data;
    a display driving integrated circuit that processes data received from the processor and transfers the processed data to the display unit; and
    a radio-frequency identification (RFID) reader that supplies power to an RFID tag, verifies the RFID tag by performing communication between the RFID tag and the processor, transfers verification data applied from the processor to the RFID tag, and transmits some of the verification data to the display unit,
    wherein the display driving integrated circuit and the RFID reader share at least one of a power voltage generating circuit, a timer, a cyclic redundancy check (CRC) calculator, a clock signal generator, and a power regulator.

11. The apparatus of claim 10, further comprising a power management unit that drives the processor and the display driving integrated circuit using electrical energy supplied from a battery.

12. The apparatus of claim 10, further comprising an antenna that receives information transferred from the RFID tag, transfers the information to the display driving integrated circuit via the RFID reader, and transfers information output from the display driving integrated circuit to the RFID tag via the RFID reader.

13. The apparatus of claim 12, wherein the antenna is a beam forming antenna.

14. The apparatus of claim 10, wherein the display driving integrated circuit and the RFID reader are incorporated in a mobile telecommunications device.

15. The apparatus of claim 10, wherein the display unit is a liquid crystal display.

16. A display driving integrated circuit, comprising:
    a clock signal generator that generates a clock signal in response to an instruction signal;
    a timer that generates a timing signal and a first control signal in response to the instruction signal and the clock signal;
    a data interface that transmits data to and receives data from a processor;
    a communication information interface that transmits information to and receives information from a radio-frequency identification (RFID) tag using an antenna;
    a logic circuit that processes information transmitted by the communication information interface according to the timing signal and the clock signal;
    a first storage device that stores RFID data or image data input through the data interface;
    a cyclic redundancy check (CRC) calculator that calculates a CRC value of data transmitted from the logic circuit and the data interface, and determines whether an error is introduced in the transmitted data during transmission to generate an error detection result;
    a command controller that generates the instruction signal according to the data transmitted received from the logic circuit and the data interface, and controls the data interface according to the error detection result such that the data applied from the data interface is transferred to the first storage device; and
    a second storage device that stores data output from the logic circuit, generates a second control signal under the control of the command controller, and transfers the stored data input from the logic circuit to the first storage device.

17. The display driving integrated circuit of claim 16, further comprising a power regulator that generates at least one regulating voltage using a power voltage applied from an external portion of the display driving integrated circuit.

18. The display driving integrated circuit of claim 17, further comprising a power voltage generating circuit for generating a plurality of base power voltages having different voltage levels from each other by using the regulating voltage, according to the first control signal, the second control signal, and the instruction signal.

19. The display driving integrated circuit of claim 16, further comprising a display driving unit for transferring the data stored in the first storage device to a display unit.

20. The display driving integrated circuit of claim 16, wherein the data interface transmits/receives the data to/from the processor in one of a parallel interface type, a serial peripheral interface (SPI) type, and high-speed serial interface (HSSI) type.

* * * * *